(12) United States Patent
Vosejpka et al.

(10) Patent No.: US 10,247,231 B2
(45) Date of Patent: Apr. 2, 2019

(54) THRUST BEARING ASSEMBLY

(71) Applicant: DOOSAN SKODA POWER S.R.O., Plzen (CZ)

(72) Inventors: Jan Vosejpka, Plzen (CZ); Frantisek Straka, Plzen (CZ)

(73) Assignee: DOOSAN SKODA POWER S.R.O., Plzen (CZ)

( * ) Notice: Subject to any disclaimer, the term of this patent is extended or adjusted under 35 U.S.C. 154(b) by 0 days.

(21) Appl. No.: 15/705,338

(22) Filed: Sep. 15, 2017

(65) Prior Publication Data

US 2018/0073555 A1 Mar. 15, 2018

(30) Foreign Application Priority Data

Sep. 15, 2016 (EP) ..................................... 16188879

(51) Int. Cl.
*F16C 17/04* (2006.01)
*F16C 17/06* (2006.01)
(Continued)

(52) U.S. Cl.
CPC ............ *F16C 17/06* (2013.01); *F01D 25/162* (2013.01); *F01D 25/168* (2013.01); *F01D 25/28* (2013.01);
(Continued)

(58) Field of Classification Search
CPC ...... F16C 17/06; F16C 41/02; F16C 2360/23; F01D 25/162; F01D 25/168
See application file for complete search history.

(56) References Cited

U.S. PATENT DOCUMENTS 1,666,521 A * 4/1928 Allen ...................... F16C 17/06
384/306
1,762,360 A * 6/1930 Schmidt .................. F16C 17/06
384/308
(Continued)

FOREIGN PATENT DOCUMENTS

CH 92468 1/1922

OTHER PUBLICATIONS

Communication dated Nov. 17, 2016 from the European Patent Office in corresponding European Patent Application No. 16188879.7.

*Primary Examiner* — Phillip A Johnson
(74) *Attorney, Agent, or Firm* — Sughrue Mion, PLLC

(57) ABSTRACT

Provided is a thrust bearing assembly including a casing, a supporting ring positioned within said casing, a leverage mechanism housed within said casing, tilting pads for contacting rotor, supporting discs connecting said leverage mechanism with said tilting pads via openings in said casing, wherein the leverage mechanism includes a plurality of first levering plates and an equal number of second levering plates, the first and second levering plates forming an endless overlapping arrangement within said casing, each first levering plate touching at contact surfaces two second levering plates and vice versa, wherein the levering plates are preferably substantially arcuate-shaped, and wherein at least all first levering plates or at least all second levering plates are tiltingly positioned on supporting pins, whereas the levering plate includes a recess with a ball-shaped protrusion within the recess, and the supporting pin includes a ball-shaped socket fitting the ball-shaped protrusion of the levering plate.

13 Claims, 4 Drawing Sheets

(51) Int. Cl.
   *F01D 25/16* (2006.01)
   *F01D 25/28* (2006.01)
   *F02C 7/06* (2006.01)
   *F16C 19/52* (2006.01)
   *F16C 41/02* (2006.01)

(52) U.S. Cl.
   CPC .............. *F02C 7/06* (2013.01); *F16C 19/522* (2013.01); *F16C 41/02* (2013.01); *F05D 2220/30* (2013.01); *F05D 2240/52* (2013.01); *F16C 2360/00* (2013.01)

(56) References Cited

U.S. PATENT DOCUMENTS

| | | | | |
|---|---|---|---|---|
| 2,102,534 A | * | 12/1937 | Howarth | F16C 17/06 384/308 |
| 2,565,116 A | * | 8/1951 | Baudry | F16C 17/06 384/308 |
| 2,874,007 A | * | 2/1959 | Cametti | F16C 17/06 29/447 |
| 3,160,450 A | | 12/1964 | Gentiluomo | |
| 3,655,250 A | | 4/1972 | Sprenger | |
| 3,702,719 A | * | 11/1972 | Hoffman | F16C 17/06 384/306 |
| 3,912,344 A | * | 10/1975 | McCafferty | F16C 17/06 384/304 |
| 4,335,925 A | * | 6/1982 | Stopp | F16C 17/06 384/125 |
| 4,403,873 A | * | 9/1983 | Gardner | F16C 17/06 384/122 |
| 4,824,263 A | * | 4/1989 | Singh | F16C 17/06 384/306 |
| 5,046,864 A | * | 9/1991 | Boller | F16C 17/06 384/306 |

* cited by examiner

THRUST BEARING ASSEMBLY

FIELD OF ART

The present invention relates to a thrust bearing assembly, suitable in particular for turbines.

BACKGROUND ART

Thrust bearing assemblies, in particular for turbines, are known, and generally comprise a supporting ring, a casing, a leverage mechanism housed within said casing, tilting pads for contacting rotor, and supporting discs. The leverage mechanism comprises two rows of levering plates. The thrust bearing is usually filled with oil, ensuring smoother function.

Thrust bearings are designed to carry loads at high speeds in turbomachinery and to accommodate misalignment or deflection. However, the current thrust bearings still suffer from unequal distribution of the forces caused by the rotor, and by lack of smooth action in said distribution. Unequal distribution of the forces results in overheating of the more loaded part and in jamming of the turbine.

U.S. Pat. No. 5,046,864 provides an improvement relying on adjusting the shape of the contact surfaces of the levering plates. This solution appears to be feasible only for a smaller number of tilting pads (e.g. 6 tilting pads). This imposes constructional limitations.

JP2013050144 allows the movement of the levering plates along one axis, however, this solution has very high technological and accuracy requirements in production.

DISCLOSURE OF THE INVENTION

A thrust bearing assembly according to the present invention comprises:
  a casing,
  a supporting ring positioned within said casing,
  a leverage mechanism housed within said casing,
  tilting pads for contacting rotor,
  supporting discs connecting said leverage mechanism with said tilting pads via openings in said casing,
  wherein the leverage mechanism comprises a plurality of first levering plates and an equal number of second levering plates, the first and second levering plates forming an endless overlapping arrangement within said casing, each first levering plate touching at contact surfaces two second levering plates and vice versa, wherein the levering plates are preferably substantially arcuate-shaped, and
  wherein at least all first levering plates or at least all second levering plates are tiltingly positioned on supporting pins, whereas the levering plate comprises a recess (preferably a substantially spherical, conical or cylindrical recess) with a ball-shaped protrusion within the recess, and the supporting pin comprises a ball-shaped socket fitting the ball-shaped protrusion of the levering plate.

The recess with the ball-shaped protrusion provided in the levering plate should be located centrally between the lines or surfaces around which the levering plate turns or rolls. In one embodiment, the recess in the levering plate is positioned in the center of gravity of the surface which is positioned on the supporting pins, i.e., the trapezoidal surface.

The recess in the levering plate has dimensions that allow to receive supporting pin and to allow rotational movement of the levering plate on contact area between the supporting pin and the levering plate. Wall of the recess forms an angle of 90 to 140 degrees, preferably 100 to 140 degrees, more preferably about 120 degrees, with the adjacent side of the levering plate.

The supporting pin can have substantially any shape, for example a cylindrical or frustoconical shape, but the shape needs to correspond to the shape of the recess and allow free movement of the levering plate. The supporting pins are typically formed integrally with the supporting discs or the supporting ring, respectively, but they may also be formed separately and removably attached to the supporting discs or the supporting ring, respectively.

In some embodiments, the first levering plates are the levering plates adjacent to the supporting ring, and the second levering plates are the levering plates adjacent to supporting discs. The term "adjacent" means "close to" and does not exclude another element being interposed between the respective set of levering plates and the supporting ring or the supporting discs, respectively.

In a preferred embodiment, the levering plates that are not positioned on supporting pins comprising a ball-shaped socket may be positioned on supporting pins comprising a ball-shaped end and the levering plate then comprises a ball-shaped socket fitting the ball-shaped end of the supporting pin.

In a preferred embodiment, the levering plates that are not positioned on supporting pins comprise a ball-shaped socket and are tiltingly positioned on a ball-shaped protrusion, or comprise a ball-shaped protrusion and are tiltingly positioned on a ball-shaped socket.

In another preferred embodiment, the levering plates that are not positioned on supporting pins comprise a cylindrically shaped socket (wherein the longitudinal axis of the cylinder is parallel with the diameter of the supporting ring) and are tiltingly positioned on a cylindrically shaped fitting protrusion, or comprise a cylindrically shaped fitting protrusion and are tiltingly positioned on a cylindrically shaped fitting socket (wherein the longitudinal axis of the cylinder is parallel with the diameter of the supporting ring).

In yet another preferred embodiment, the levering plates that are not positioned on supporting pins comprise a ball-shaped socket, and the supporting ring or the supporting discs, respectively, comprise a ball-shaped socket, and said levering plates are positioned on a ball-shaped member fitting into the two ball-shaped sockets.

In one preferred embodiment, both the first levering plates and the second levering plates are positioned on supporting pins.

The first levering plates and the second levering plates possess surfaces for touching or contacting each other. In a preferred embodiment, the contacting surface of first levering plates has a cylindrical or convex shape and the contacting surface of second levering plates has a flat shape, or the contacting surface of first levering plates has a flat shape and the contacting surface of second levering plates has a cylindrical or convex shape. In another embodiment, the contacting surfaces of all levering plates have a cylindrical or convex shape. In yet another embodiment, the contacting surfaces of all levering plates are flat. In yet another embodiment, all levering plates may have one contacting surface flat and one contacting surface cylindrical or convex. It is especially preferred when at the contact of two contacting surfaces of two levering plates, one contacting surface is flat and the other contacting surface is cylindrical or convex.

The supporting pins typically have the shape of a truncated cone in at least part of their length, narrowing towards the levering plate.

The thrust bearing may further comprise pad stops for fixing the tilting pads, e.g. in the form of elements fitting into recesses in the tilting pads.

In one preferred embodiment the tilting points of all first levering plates and of all second levering plates are located in substantially one plane.

In another preferred embodiment the tilting points of the first levering plates are in a first plane, and the tilting points of the second levering plates are in a second plane, together with the flat contact surfaces of the levering plates. The first and the second planes are parallel.

It is preferred when the radius of the ball-shaped protrusion in the levering plate of the invention is substantially equal to the distance between the trapezoidal surface of the levering plate and the contacting surface of the levering plate.

The thrust bearing in which the present invention is embodied is preferably an axial thrust bearing.

The present invention provides a thrust bearing assembly enabling at least one type of levering plates to tilt in all directions, preferably all levering plates to tilt in all directions. This enables a homogenous distribution of the thrust power of the rotor to the bearing over all tilting pads. While the solutions known in the prior art are suitable for bearings with fewer tilting pads (e.g., up to six), it was found that the present invention enables to produce thrust bearings having up to twenty tilting pads, where the powers are still homogenously distributed, thus preventing overloading of one part of the bearings which may result in overheating and jamming of the bearing. According to the present invention, at least the first and/or at least the second levering plates are tiltable in all directions, and are preferably in almost one plane, thereby being tiltable while requiring minimum equalizing force.

EXAMPLES OF CARRYING OUT THE INVENTION

Figure 1:
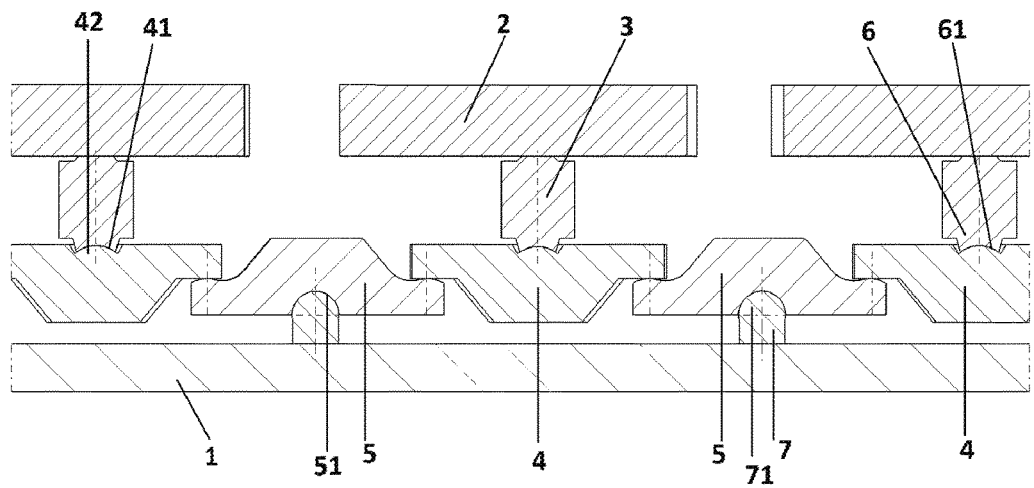
FIG. 1 shows the first embodiment described herein below.

The first embodiment, shown in FIG. 1, provides a thrust bearing assembly comprising a supporting ring 1, a casing (not shown), a leverage mechanism housed within said casing, tilting pads 2 for contacting rotor (not shown), and supporting discs 3 connecting said leverage mechanism with said tilting pads 2 via openings in said casing. The leverage mechanism comprises a plurality of first levering plates 5 and an equal number of second levering plates 4, the first and second levering plates forming an endless overlapping arrangement within said casing, each first levering plate 5 touching at contact surfaces two second levering plates 4 and vice versa, wherein the first levering plates 5 are adjacent to the supporting ring 1, and the second levering plates 4 are adjacent to supporting discs 3. The levering plates 4, 5 are substantially arcuate-shaped. All second levering plates 4 are tiltingly positioned on supporting pins 6, said supporting pins being formed integrally with the supporting discs 3. Each second levering plate 4 comprises a substantially conical recess 41 (located within the center of gravity of the trapezoidal surface) with a ball-shaped protrusion 42 within the recess 41, and each frustoconically-shaped supporting pin 6 comprises a ball-shaped socket 61 fitting the ball-shaped protrusion 42 of the levering plate 4.

The first levering plates 5 are positioned on supporting pins 7 comprising ball-shaped ends 71 and the levering plates 5 comprise ball-shaped sockets 51 fitting the ball-shaped ends 71 of the supporting pins 7.

The first levering plates 5 and the second levering plates 4 possess surfaces for touching or contacting each other. The contacting surfaces of first levering plates 5 have a cylindrical shape and the contacting surfaces of second levering plates 4 have a flat shape.

In the present embodiment, the tilting points of all first levering plates and of all second levering plates are located substantially in one plane. It would also be acceptable if they were located in two parallel planes, the tilting points of all first levering plates in a first plane, and the tilting points of all second levering plates in a second plane, the first and the second planes being parallel to each other. It is advantageous if the first and the second planes are as close to each other as possible.

In another similar embodiment which is not shown in the figures, the supporting pins 6 could be formed as separate members detachable of supporting discs 3.

Figure 2:
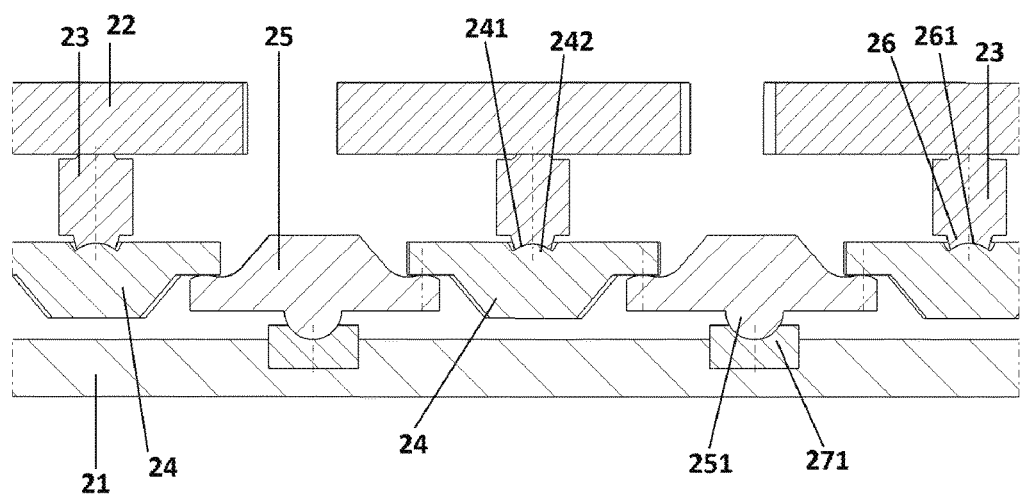
FIG. 2 shows the second embodiment described herein below.

The second embodiment, shown in FIG. 2, provides a thrust bearing assembly comprising a supporting ring 21, a casing (not shown), a leverage mechanism housed within said casing, tilting pads 22 for contacting rotor (not shown), and supporting discs 23 connecting said leverage mechanism with said tilting pads 22 via openings in said casing. The leverage mechanism comprises a plurality of first levering plates 25 and an equal number of second levering plates 24, the first and second levering plates forming an endless overlapping arrangement within said casing, each first levering plate 25 touching at contact surfaces two second levering plates 24 and vice versa, wherein the first levering plates 25 are adjacent to the supporting ring 21, and the second levering plates 24 are adjacent to supporting discs 23. The levering plates 24, 25 are substantially arcuate-shaped. All second levering plates 24 are tiltingly positioned on supporting pins 26, said supporting pins being formed integrally with the supporting discs 23. Each second levering plate 24 comprises a substantially conical recess 241 with a ball-shaped protrusion 242 within the recess 241, and each frustoconically-shaped supporting pin 26 comprises a ball-shaped socket 261 fitting the ball-shaped protrusion 242 of the levering plate 24.

The first levering plates 25 comprise ball-shaped protrusions 251 and are tiltingly positioned on ball-shaped sockets 271 within the supporting ring 21.

The skilled person will understand that while the depicted embodiments show the second levering plates 4 as being positioned on the supporting pins having a ball-shaped socket, also the inverted embodiments are possible, where the first levering plates 5 are positioned on the supporting pins having a ball-shaped socket. Alternatively, both sets of the levering plates 4, 5 can be positioned on the supporting pins having a ball-shaped socket.

Figure 3:
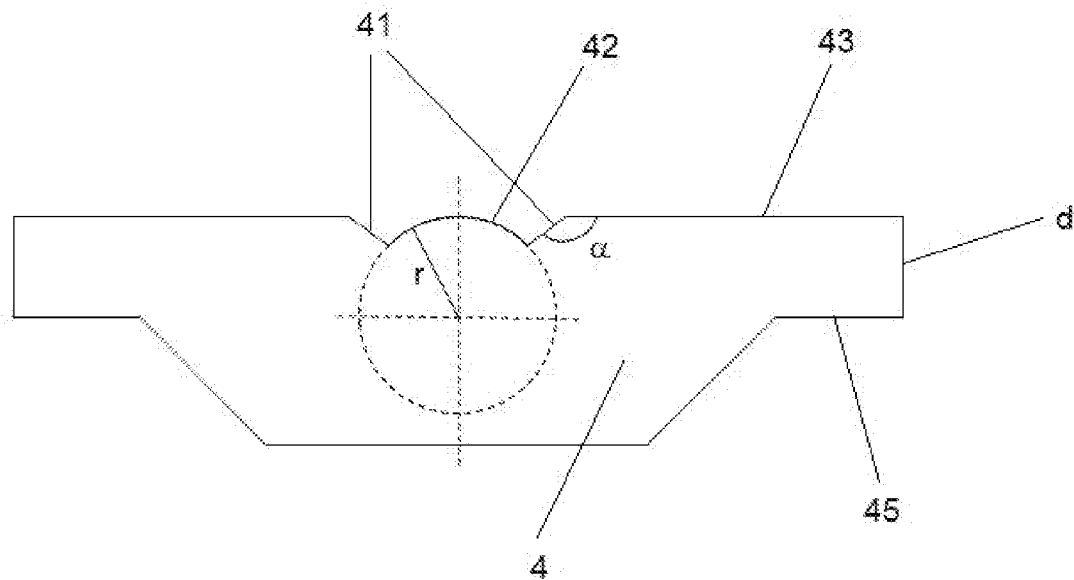
FIG. 3 shows cross-section of the second levering plate according to the first and to the second embodiment described herein below.

FIG. 3 shows cross-section of the second levering plate according to the first and to the second embodiments described above.

The second levering plate 4 comprises (in the center of gravity 44 of its trapezoidal surface 43) a substantially conical recess 41 with a ball-shaped protrusion 42 within the recess 41. The conical recess 41 should be enough wide to be able to receive frustroconical pin 6 and to allow rotational movement on contact area between ball-shaped protrusion 42 and ball shaped socket 61. Wall of the conical recess 41 and the plane of the levering plate 4 side 43 form an angle a of about 120 degrees. Radius r of the balled-shaped protrusion 42 is substantially equal to a distance d between the trapezoidal surface 43 of the levering plate 4 and the contacting surface 45 of the levering plate 4. In this case radius r and distance d are equal, a position of center of rotation of levering plate 4 and contact points of contacting surface plane 45 are substantially within one plane to improve equalization of distribution of forces acting in the thrust bearing.

Figure 4:
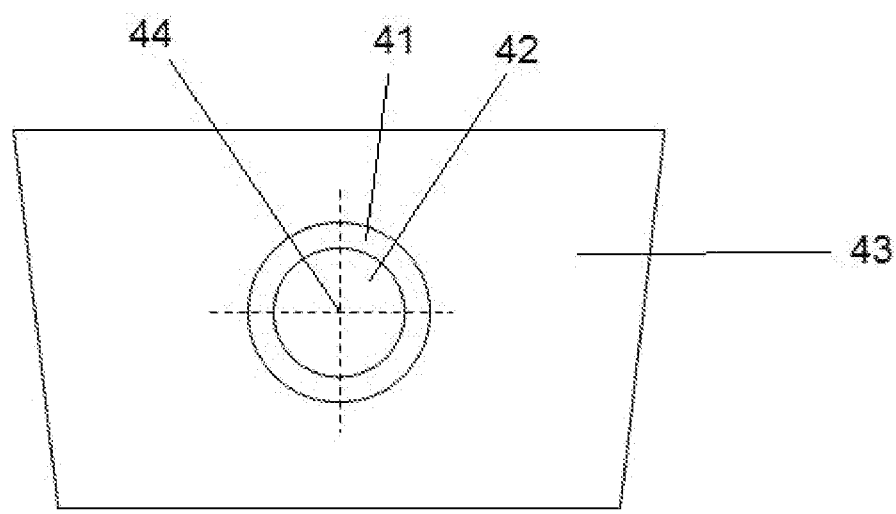
FIG. 4 shows a top view of the second levering plate according to the first and to the second embodiment described herein below.

FIG. 4 shows a top view of the second levering plate 4 according to the first and to the second embodiment of the invention. The trapezoidal surface 43 which is the side of the levering plate contacting the supporting pin is shown. The ball shaped protrusion 42 is positioned in the center of gravity 44 of the trapezoidal surface 43 of the levering plate.

Figure 5:
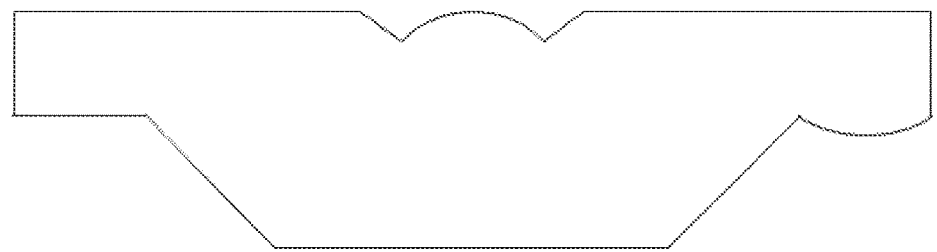
FIG. 5 schematically shows a cross-section of a levering plate with one flat contacting surface and one cylindrical contacting surface.

FIG. 5 shows a cross-sectional view of a levering plate having one flat contacting surface and one cylindrical contacting surface.

Figure 6:
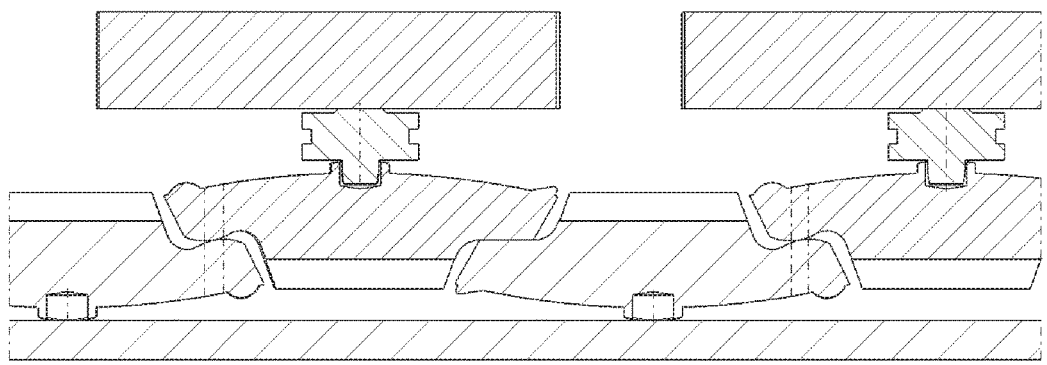
FIG. 6 shows an embodiment according to prior art.
Figure 7:
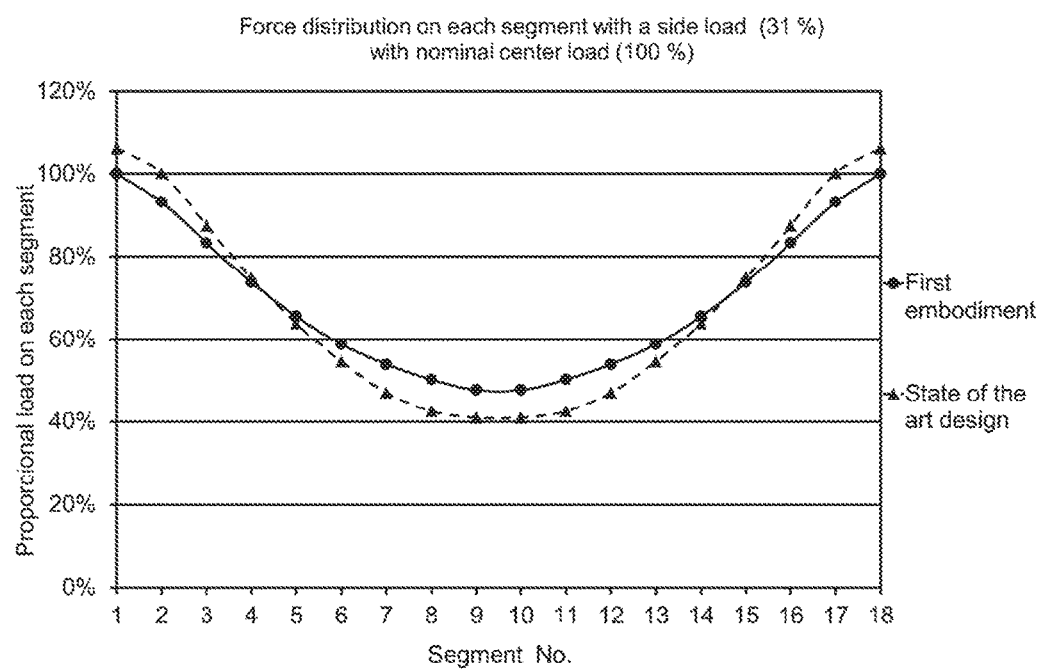
FIG. 7 shows a chart of force distribution on each levering plate (segment), comparison of the first embodiment of the present invention (FIG. 1) and of the embodiment according to prior art (FIG. 6—state of the art design).

FIG. 7 shows an improvement in force distribution on each levering plate (segment) for the present invention (embodiment of FIG. 1), compared to a prior art design (shown in FIG. 6). The prior art design is a design which is currently commercially available.

The invention claimed is:

1. A thrust bearing assembly comprising:
a casing,
a supporting ring positioned within said casing,
a leverage mechanism housed within said casing,
tilting pads for contacting a rotor,
supporting discs connecting said leverage mechanism with said tilting pads via openings in said casing,
wherein the leverage mechanism comprises a plurality of first levering plates and an equal number of second levering plates, the first and second levering plates forming an endless overlapping arrangement within said casing, each first levering plate touching two second levering plates at contact surfaces and vice versa, wherein the first and second levering plates are preferably substantially arcuate-shaped, and
wherein at least the first levering plates or at least the second levering plates are tiltingly positioned on supporting pins, whereas the at least first levering plates or the at least second levering plates comprise a recess, having a conical, cylindrical or spherical shape, with a ball-shaped protrusion within the recess, and the supporting pins, on which the at least first levering plates or the at least second levering plates are tiltingly positioned, comprise a ball-shaped socket fitting the ball-shaped protrusion of the at least first levering plates or the at least second levering plates.

2. The thrust bearing assembly according to claim 1, wherein the supporting pins are formed integrally with the supporting discs or the supporting ring.

3. The thrust bearing assembly according to claim 1, wherein the supporting pins are formed separately and removably attached to the supporting discs or the supporting ring.

4. The thrust bearing assembly according to claim 1, wherein the first or second levering plates that are not positioned on the supporting pins comprising a ball-shaped socket may be positioned on the supporting pins comprising a ball-shaped end and the said first or second levering plates then comprises a ball-shaped socket fitting the ball-shaped end of the supporting pins.

5. The thrust bearing assembly according to claim 1, wherein the first or second levering plates that are not positioned on the supporting pins comprise a ball-shaped socket and are tiltingly positioned on a ball-shaped protrusion, or comprise a ball-shaped protrusion and are tiltingly positioned on a ball-shaped socket.

6. The thrust bearing assembly according to claim 1, wherein the first or second levering plates that are not positioned on the supporting pins comprise a ball-shaped socket, and the supporting ring or the supporting discs comprise a ball-shaped socket, and said first or second levering plates are positioned on a ball-shaped member fitting into the two ball-shaped sockets.

7. The thrust bearing assembly according to claim 1, wherein the first or second levering plates that are not positioned on the supporting pins comprise a cylindrically shaped socket, wherein the longitudinal axis of the cylinder is parallel with the diameter of the supporting ring, and are tiltingly positioned on a cylindrically shaped fitting protrusion, or comprise a cylindrically shaped fitting protrusion and are tiltingly positioned on a cylindrically shaped fitting socket, wherein the longitudinal axis of the cylinder is parallel with the diameter of the supporting ring.

8. The thrust bearing assembly according to claim 1, wherein the first levering plates and the second levering plates possess the contact surfaces for touching or contacting each other, and the contact surfaces of first levering plates have a cylindrical or convex shape and the contact surfaces of second levering plates have flat shape, or the contact surfaces of first levering plates have a flat shape and the contact surfaces of second levering plates have a cylindrical or convex shape, or the contact surfaces of the first and second levering plates have a cylindrical or convex shape, or all levering plates have one flat and one cylindrical or convex contact surface.

9. The thrust bearing assembly according to claim 1, wherein the thrust bearings further comprises pad stops for fixing the tilting pads.

10. The thrust bearing assembly according to claim 9, wherein the pad stops for fixing the tilting pads are in the form of elements fitting into recesses in the tilting pads.

11. The thrust bearing assembly according to claim 1, wherein the tilting points of the first levering plates and of the second levering plates are located in substantially one plane.

12. The thrust bearing assembly according to claim 1, wherein the tilting points of the first levering plates are substantially in a first plane, and the tilting points of the second levering plates are substantially in a second plane, whereas the first and the second planes are parallel.

13. The thrust bearing assembly according to claim 1, which is an axial thrust bearing for a turbine.

* * * * *